United States Patent [19]
Foster

[11] 3,914,120
[45] Oct. 21, 1975

[54] INDIVIDUAL SECTION HIGH SPEED GLASSWARE FORMING MACHINE
[75] Inventor: Thomas Vincent Foster, Doncaster, England
[73] Assignee: Emhart Corporation, Farmington, Conn.
[22] Filed: Apr. 18, 1974
[21] Appl. No.: 462,078

[30] Foreign Application Priority Data
Nov. 23, 1973  United Kingdom............... 54389/73

[52] U.S. Cl. ...................... 65/229; 65/241; 65/242; 65/359; 65/361
[51] Int. Cl.² ......................................... C03B 9/00
[58] Field of Search ............. 65/229, 230, 231, 241, 65/304, 239, 240, 80, 242, 359, 361

[56] References Cited
UNITED STATES PATENTS

| | | | |
|---|---|---|---|
| 1,859,230 | 5/1932 | Canfield............................. | 65/241 X |
| 1,859,231 | 5/1932 | Canfield............................. | 65/241 |
| 1,868,249 | 7/1932 | Parham............................. | 65/241 |
| 1,876,005 | 9/1932 | Hoge et al. ....................... | 65/241 |
| 3,198,617 | 8/1965 | Denman et al. .................. | 65/304 X |
| 3,223,511 | 12/1965 | Rowe................................ | 65/240 |
| 3,334,985 | 8/1967 | Lippmann et al................. | 65/240 X |
| 3,434,820 | 3/1969 | Zappia et al...................... | 65/229 |
| 3,622,305 | 11/1971 | Becker............................... | 65/229 |
| 3,765,862 | 10/1973 | Rowe................................ | 65/264 |

Primary Examiner—S. Leon Bashore
Assistant Examiner—Frank W. Miga
Attorney, Agent, or Firm—McCormick, Paulding & Huber

[57] ABSTRACT

An individual section of a multiple section glassware forming machine is shown wherein each such section preferably includes three stations performing separate and sequential operations in forming articles of glassware. Each such section may be adapted for "single gob" or "multiple gob" use whereby each station in the section performs its operation in forming either a single article of glassware or multiple articles at the same time. The section shown is adapted for "double gob" operation. Its first station is utilized in forming (by overhead pressing plungers) two parisons in upright parison molds. Its second station is utilized to further form the parisons either in intermediate blow molds or by suspending the parisons for a re-heat. Its third station is utilized to blow the parisons into the final shape of the glassware article being made. The stations are spaced along the longitudinal center line of the machine section, and a transfer mechanism is provided which includes a reciprocating carriage for supporting and moving the parisons and the finally shaped articles along, substantially horizontally, from station to station and onto a deadplate in sequence. After reaching the deadplate, the finally shaped articles are moved onto a conveyor by means of mechanism not a part of this invention.

26 Claims, 8 Drawing Figures i,914,120

INDIVIDUAL SECTION HIGH SPEED GLASSWARE FORMING MACHINE

BACKGROUND OF THE INVENTION

Individual section (I.S.) glassware forming machines such as shown for example in U.S. Pat. No. 1,911,119, comprise a plurality of sections arranged in side-by-side relationship. Each such section in and of itself comprises a forming machine for converting a molten gob of glass at first into a parison and then into a finally shaped article of glassware. That is, each such section includes at least one parison mold, wherein parisons are formed either by pressing or blowing, and at least one final shaping blow mold wherein the parisons are blown into the final shape of the desired article of glassware. In the conventional I.S. machine, the parison mold is inverted, and transfer mechanism including a neck ring structure engages the inverted parison and swings it through an arc into an upright position in the blow mold for final shaping.

Production efficiency and economy dictate that the individual sections of the machine be operated in timed relationship with each other so that the sections will produce the final articles of glassware in sequence, section after section. The same considerations dictate the use of a single feeder structure which feeds the molten gobs of glass to the parison molds in sequence, section after section. With this arrangement, the finished articles of glassware are placed on a common take-away conveyor section after section so that a substantially continuous line or continuous lines of glassware move along the conveyor, generally to a lehr for annealing.

It is the general object of the present invention to provide an I.S. type glassware forming machine wherein each individual section thereof is constructed and arranged; to provide for an intermediate forming of a parison at a station between the parison mold and the final blow mold; to eliminate the need for an inverting transfer mechanism; and to make either narrow neck or wide mouth glassware of either light weight or heavy construction (that is, thin-wall or thick-wall ware) at high speed.

SUMMARY OF THE INVENTION

In keeping with the invention there will be provided a glassware forming machine section having a frame wherein three operating stations are defined in horizontally spaced apart relationship longitudinally of the frame. The first such station is to include at least one or (in the event of a multiple gob machine operation) more upright top-opening blank or parison molds. The second of such stations includes movable parts to engage and support a parison for further forming after it has been initially formed at the first station. The third such station includes a mold adapted to engage and support the further formed parison for final shaping as an article of glassware.

A movable support structure is disposed over the first station in the section and carries a guide chute and a plunger actuator. The guide chute is positioned over the parison mold to guide a gob of molten glass into it and then a plunger is thrust into the mold to form a parison. A transfer mechanism including a carriage is utilized to transport the formed parison to the second station, then to the third station, and then out of the third station. The carriage includes neck ring parts which engage the parison at the first station and carry it to the second station before return to the first station. Pairs of tongs are also carried by the carriage, one pair being utilized to move the parison from the second station to the third station before return and a second pair being utilized to transport the finally formed article out of the mold at the third station.

In one form of the invention, a blow mold is provided at the second station and a blow head is mounted on the carriage for association therewith to further form a parison taken from the first station. In an alternative form, the parison is supported at the second station on fingers in a suspended condition and permitted to reheat and stretch, but without necessarily blowing being involved. In both forms, the further formed parison is blown into final shape at a blow mold at the third station, and a blowhead is supported on the carriage for association with the said blow mold.

DESCRIPTION OF THE PREFERRED EMBODIMENTS

Figure 1:
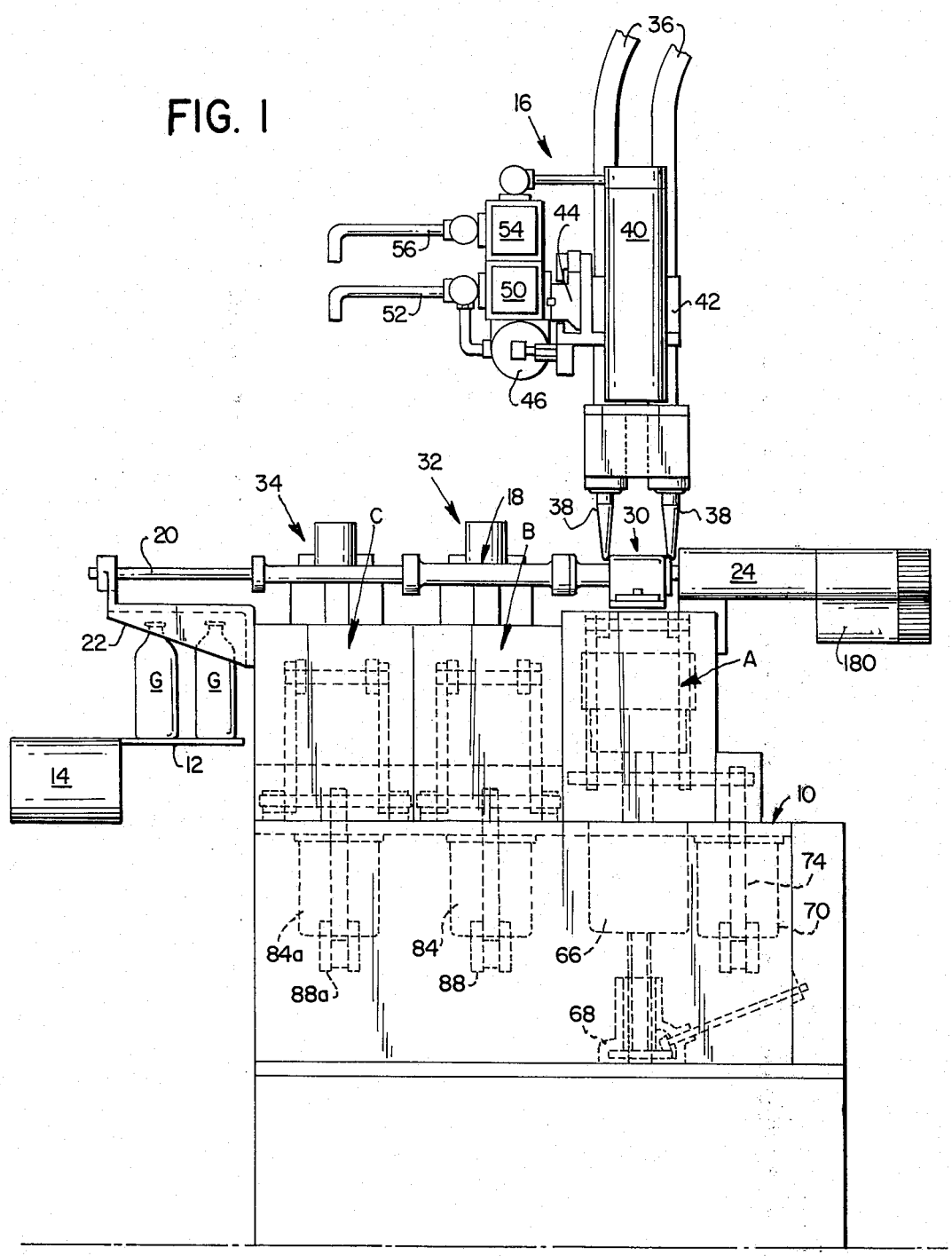
FIG. 1 is a side elevational view of a forming machine section provided in accordance with the present invention.

As best seen with reference to FIG. 1, the individual section of the glassware forming machine has a frame 10 within which there are three operating stations or areas provided in spaced apart relationship along the longitudinal center line of the section, these stations being designated generally as the first station A, a second station B and a third station C. The machine section shown is particularly adapted for "double gob" operation wherein a pair of glassware parisons are initially formed at the station A and then transferred to the station B for further forming and then transferred finally to the station C for final shaping as articles of glassware such as the bottles G, G shown in FIG. 1. When the glassware articles have been finally shaped as by blowing, they are moved out of the machine section onto a deadplate 12 and they are thereafter moved onto a take-away conveyor 14 where they are placed in a line with other similar articles formed by the other individual sections of the forming machine.

The machine section shown utilizes upright blank or parison molds at the station A, and it is particularly adapted to make the articles of glassware in a press and blow technique. Thus, there is a mechanism indicated generally by the reference number 16 located over the first station A and which includes guide means for introducing gobs of glass to the parison molds at the station A and it also includes plungers for pressing the gobs of glass into parisons at the blank or parison molds.

Still referring to FIG. 1 for an understanding of the general arrangement of the major elements, it will be seen that a transfer mechanism is utilized which includes a carriage indicated generally at 18 which is supported on a pair of horizontally disposed guide rods 20, 20 extending longitudinally of the machine section 10 over and straddling the stations A, B and C and extending onwardly over the deadplate 12. The outer ends of the rods are supported in a bracket 22 secured over the deadplate 12 on the section frame 10, and the inner end portions of the said guide rods are extended through cylinders 24, 24 mounted on the inner end portion of the machine section frame 10 and extending inwardly beyond said frame. Each such cylinder 24 comprises a part of a reciprocable fluid motor which also includes a piston 26 (FIG. 3), the said piston being annular and surrounding an associated rod 20 and having an outwardly projecting extension 28 which is connected with the carriage 18. Thus, as the annular pistons 26, 26 are reciprocated within the cylinders 24, 24, the carriage 18 is reciprocated between a retracted position shown in FIG. 1 and an extended position shown in FIGS. 2 and 3.

Figure 2:
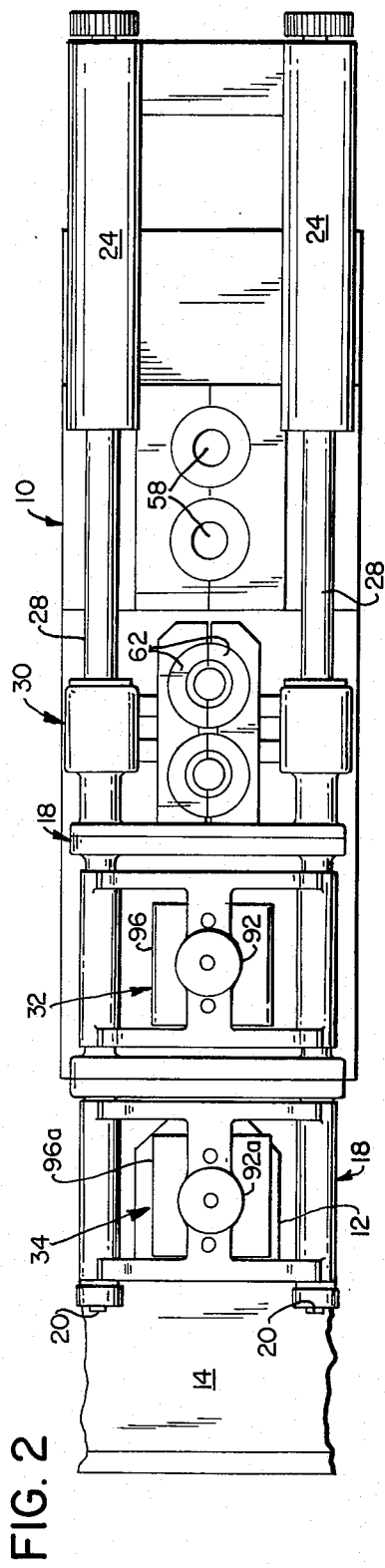
FIG. 2 is a larger scale plan view of the machine section, but showing the transfer carriage in an extended rather than in retracted position.
Figure 3:
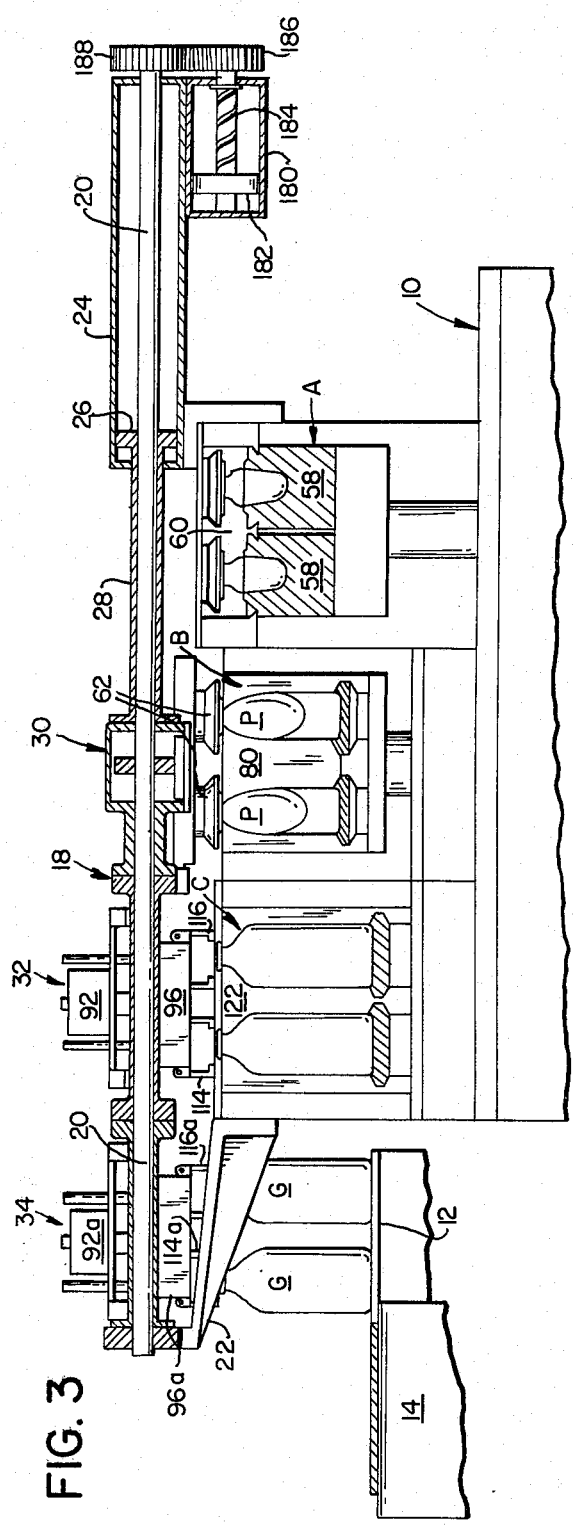
FIG. 3 is an irregular vertical longitudinal sectional view taken through the machine section, the upper portion of the view being taken along one of the guide rods for the transfer mechanism and the lower portion of the view being taken along the longitudinal center line of the machine section.

The carriage 18 supports a neck ring mechanism 30 over the parison molds at the station A in its retracted position, and in such position it supports a first combined blowhead and tong mechanism 32 over the second station B, and it also supports a similar combined blowhead and tong mechanism 34 over the third station C, all as shown in FIG. 1. In the extended position of the carriage 18, as shown in FIGS. 2 and 3, the neck ring mechanism 30 is located over the second station B, the first blowhead and tong mechanism 32 is disposed over the third station C, and the second blowhead and tong mechanism 34 is located over the deadplate 12.

Figure 4:
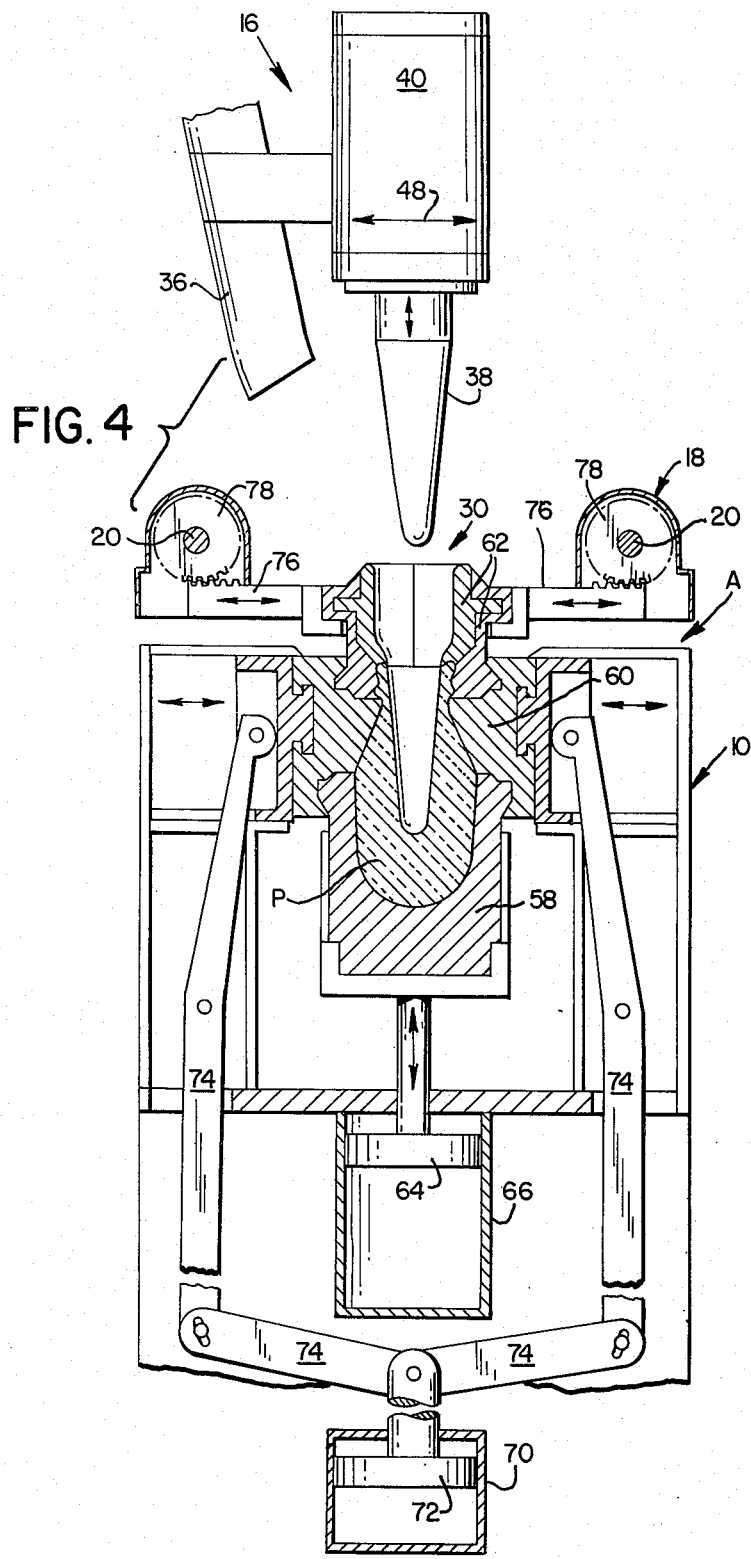
FIG. 4 is a transverse vertical cross-sectional view taken through the first station of the machine section.

Turning now to the structure and operations at the first station A, attention is directed to the gob guide and plunger mechanism 16 shown in FIGS. 1 and 4.

Since the machine section is adapted for double gob operation, there are two gob guide chutes 36, 36 provided for guiding molten gobs of glass into the two blank or parison molds to be described, and there are two plungers 38, 38 provided to be thrust into the molds by a plunger actuator 40. The parison molds are rather closely spaced along the longitudinal center line of the section frame 10, and this dictates that the chutes 36, 36 and the plungers 38, 38 be similarly spaced so as to be in registry with the top openings of the cavities in the parison molds, selectively. That is, the chutes 36, 36 are to be placed over the molds to guide the gobs into them, and then they are moved aside so that the plungers 38, 38 will be disposed over the molds. This is accomplished by mounting the chutes and the plunger actuator 40 on a slide 42 which is movable transversely relative to the section frame 10 on a fixed frame structure 44 located over the section frame. A reversible motor 46, which preferably comprises a cylinder and piston, is provided to move the support 42 transversely of the machine section, as indicated by the double head arrow 48 at FIG. 4, in timed relationship to the operation of the other elements in the machine section and in relationship to the operation of other sections in the composite machine. Thus, either the plungers or the guide chutes are located over the parison molds as can be seen in FIG. 4 wherein the plungers are shown to be in position over the molds.

The reversible fluid motor 46 is preferably air operated, and the assembly 16 carries an accummulator 50 for collecting air under pressure for such motor operation, the accummulator 50 being connected to a source of air as by a conduit 52. The plunger actuator 40 also preferably comprises an air operator cylinder and piston, the assembly 16 also including an accummulator 54 for the plunger actuator, and the accummulator 54 is connected to a source of air under pressure as by a conduit 56. In the preferred form, there is only one cylinder and piston actuator 40 utilized, the piston being connected at the bottom of the cylinder to the pair of plungers 38, 38.

Each blank mold construction at the station A in the form shown in FIG. 4 includes a one-piece body mold element 58 having a relatively wide open top cavity, a multi-part intermediate mold section 60 and a multi-part neck ring mold 62 which is a part of the neck ring structure 30. The open top body mold element 58 is movable vertically on the end of a piston 64 which is reciprocable in a cylinder 66. The body mold 58 is elevated by the piston 64 to the position shown in FIG. 4 to receive a gob of molten glass from one of the chutes 36, and it remains in the elevated position until the parison has been formed. Then, the body mold is moved downwardly to be stripped off the formed parison. In the preferred construction, a single piston 64 operating in a single cylinder 66 will be employed to raise and lower the body molds of the side-by-side blank mold constructions, and the cylinder 66 is preferably adjustably supported in the section frame 10 so that the extended and retracted positions of the body mold elements can be adjusted for the making of parisons of different shape and size. The means effecting such vertical adjustment comprises a manually operable jack screw 68 shown in FIG. 1 but eliminated from FIG. 4 for convenience.

As seen in FIG. 4, the separable parts of the neck ring 62 are mounted on respective racks 76, 76 which are slidable in the carriage 18 toward and away from each other and thus transversely of the section frame 10. The racks are caused to slide toward and away from each other by a pair of pinions 78, 78 which are keyed to the respective guide rods 20, 20, but are slidable along the guide rods with the carriage 18. Thus, by simultaneously rotating the guide rods 20, 20 in opposite directions, the racks 76, 76 are caused to move either toward or away from each other and thus to close or open the neck ring 62.

The preferred reversible motor means for rotating the guide rods to open and close the neck rings comprises a pair of cylinders and pistons, there being one such cylinder 180 and piston 182 (FIG. 3) associated with each carriage cylinder 24 and guide rod 20. Each piston 182 is so constructed that as it is moved within its associated cylinder 180 in one direction it causes rotation of a piston rod or shaft 184 in one direction, and as the piston experiences reverse movement the rod 184 is rotated in the opposite direction. A gear 186 is supported on a projecting end of the shaft 184 in mesh with a gear 188 on the projecting end of the associated guide rod 20. Thus, by reversing the direction of movement of the piston 182 in its cylinder 180, the associated guide rod 20 is caused to rotate in one and an opposite direction. This rotation of the guide rod, as previously mentioned, effects reciprocation of a neck ring rack 76 with which it is associated through a pinion 78.

A neck ring 62 is essential in making all articles of glassware, but the intermediate mold 60 is needed only when making relatively narrow neck articles. When relatively wide mouth glassware articles are to be made, the neck ring 62 can be located immediately above the body mold 58 and in engagement therewith. The neck ring 62 and the body mold 58 are then held together during the pressing process by a clamp of dovetail construction which is actuated by means similar to the means described below for moving the intermediate molds 60.

As mentioned earlier, the parts of the neck ring 62 are moved transversely of the machine frame 10 to engage each other and define the neck ring and in so doing they will grip the upper portion or "finish" of the parison when formed by the plunger. The parts of the intermediate mold 60 also move transversely of the frame 10 into and out of engagement and when engaged they form a part of the parison mold cavity which is relatively narrow at the top to match the neck ring opening and relatively wide at the bottom to match the top of the body mold cavity. It will be seen in FIG. 4 that the parts of the intermediate mold 60 are so constructed and arranged as to engage the lower portion of the neck ring parts 62 and the upper portion of the body mold 58 to clamp them together.

In the preferred construction, the intermediate mold parts are moved into and out of engagement by a reversible motor comprising a cylinder 70 and piston 72 (FIG. 4). The cylinder is located within the section frame 10 alongside the body mold cylinder 66 as shown in FIG. 1, but for convenience of illustration, it is shown in FIG. 4 below the cylinder 66. The fluid motor piston 72 is connected by a linkage structure 74 which is arranged to effect horizontal movement of the intermediate mold parts responsive to vertical movement of the piston 72 in the cylinder 70.

Figure 5:
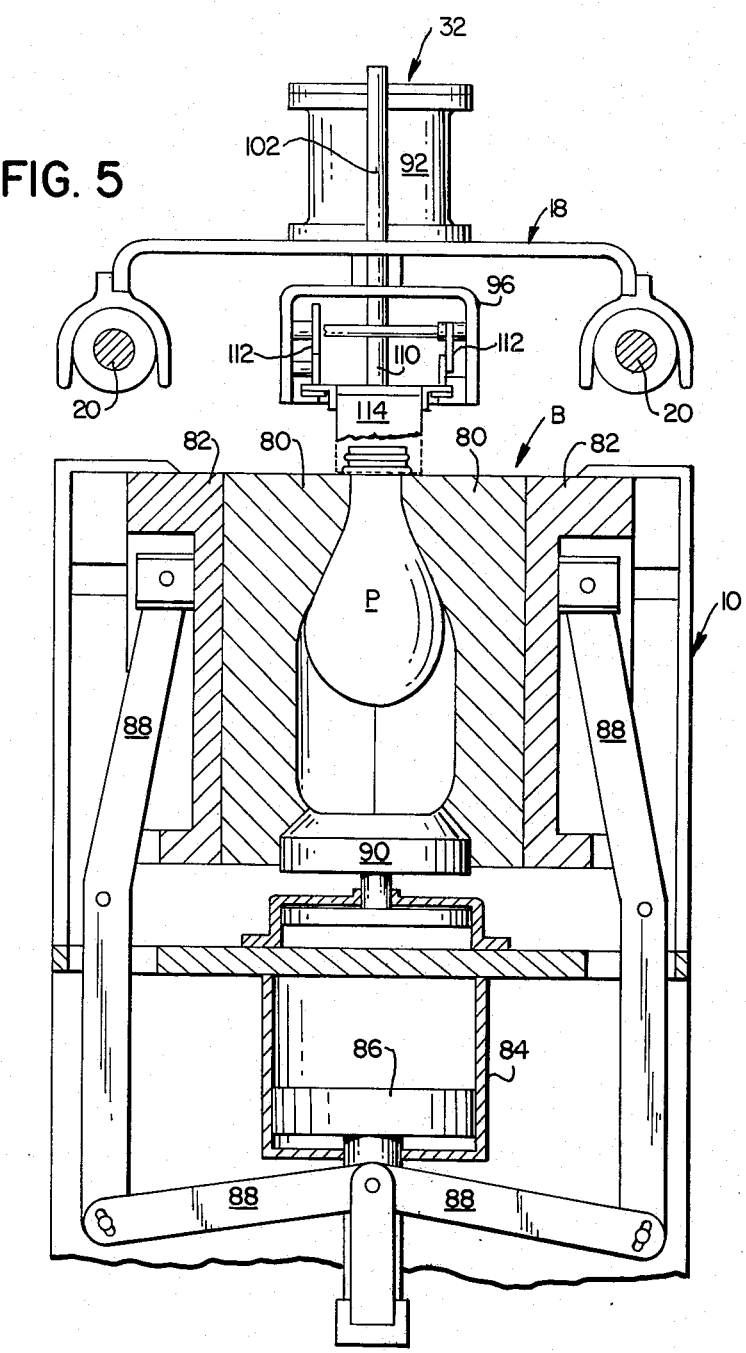
FIG. 5 is a transverse vertical cross-sectional view taken through the second station of the machine section.

The construction of the machine section at the station B is shown in FIG. 5, and it will be noted that two of the principal elements at this station comprise the halves 80, 80 of a separable preliminary blow mold. That is, there are two such blow mold halves provided at the station B for each parison P formed at the station A and carried by the neck ring structure and carriage 18 to the station B. Thus, in the double gob section disclosed there will be two preliminary blow molds, each having the parts 80, 80 which are movable transversely of the section frame 10 into engagement with each other to define a cavity for the parison P and away from each other to release the parison after it has been preliminarily shaped by blowing. The mold halves for the two molds are reciprocated toward and away from each other by a pair of carriers 82, 82 which are operated for sliding movement by a cylinder 84 and piston 86, the piston being connected to the carriers by the linkages 88, 88 (FIG. 5).

The mold halves 80, 80 for each parison P in addition to engaging each other to form a mold cavity, also engage a vertically adjustable bottom plate 90 which defines the bottom of the cavity. The mold halves are engaged with each other and with the bottom plate to define the cavities immediately after the parisons P, P have been transferred to the station B by the neck ring structure 30. It will be observed that the mold halves engage the parisons below the finish portion which is engaged by the neck rings, and immediately after they have engaged the parisons, the neck rings are opened and the neck ring structure 30 is returned to the station A by the carriage 18 with the neck rings still open. This leaves the upper portion of the parisons exposed for operation of the combined blowhead and tong structure 32 at the station B as will now be described with reference to FIGS. 5 and 6.

Figure 6:
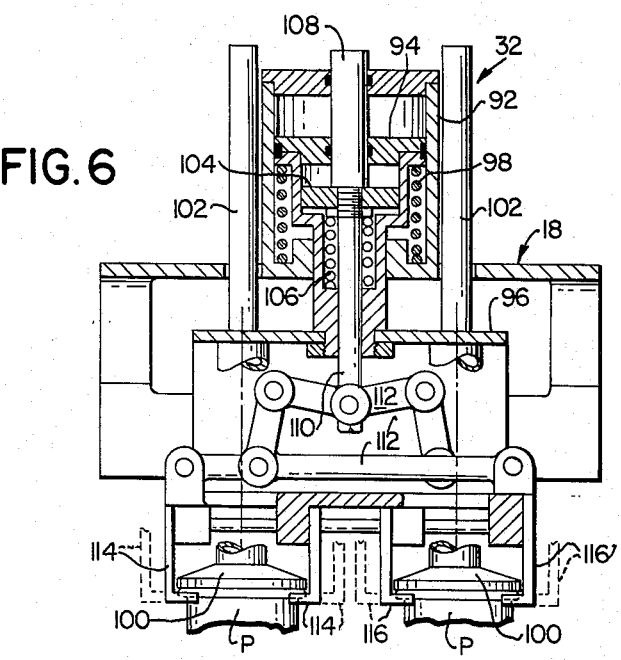
FIG. 6 is a vertical longitudinal sectional view taken through a blowhead and tong structure such as is supported by the carriage in its retracted position over the second and third stations of the machine section.

As previously mentioned, the structure 32 is supported on the reciprocable carriage 18. An important element of the structure 32 is a cylinder 92 having a vertically reciprocable piston 94 which carries and thus raises and lowers a blowhead 96 over the parisons P, P at the station B as best shown in FIG. 6. The piston 94 and thus the blowhead 96 is biased upwardly by a compression spring 98, but it is moved downwardly in opposition to the force of the spring 98 when air under pressure is introduced above the piston. When moved downwardly to the position shown in FIG. 6, the blowhead 96 carries the outwardly flared ends 100, 100 of a pair of air lines 102 into contact with the upper ends or finish of the respective parisons P, P. When the open ends of the parisons are so engaged, air under pressure is introduced to them through the air lines or conduits 102, 102 to blow the parisons into a preliminary shape or form as defined by the cavities in the preliminary blow molds.

A second piston 104 is carried by the blowhead 96 for vertical reciprocation, and it is this piston which operates the tong structure forming a part of the composite structure 32. More specifically, the piston 104 is vertically reciprocable with in a portion of the blowhead 96 and it is normally biased upwardly by a compression spring 106 toward the first or main blowhead piston 94. A tubular extension 108 on the piston 104 projects through the piston 94 and provides an entry for air under pressure to be introduced between the first piston 94 and the second piston 104 whereby to move the second piston 104 downwardly in opposition to the force of the spring 106.

A downwardly projecting extension or rod 110 is connected by linkages 112, 112 to the tongs 114, 114 of a front pair associated with the front mold at the station B and with the tongs 116, 116 of a pair associated with the rear mold at the station B. As will be seen in FIG. 6, the tongs slide substantially horizontally, the tongs in each pair being reciprocable toward and away from each other longitudinally of the section frame to engage an associated parison P below its finish and above the mold halves 80, 80 of the associated preliminary blow mold. The operating linkage arrangement is such that the left-hand tong 114 and the left-hand tong 116 as viewed in FIG. 6 move together and the right-hand tong 114 and right-hand tong 116 also move together.

The blowhead and tong assembly 32 is operated at the station B after the carriage 18 has been extended and retracted, thus after parisons have been delivered by the neck rings and engaged by the preliminary blow molds and the neck rings have been returned to the station A. That is, after the mold halves 80, 80 have closed upon the initially formed parisons and the neck rings have opened and been retracted, the blowhead 96 is lowered into the position shown in FIG. 6 by introducing air under pressure over the piston 94. When the blowhead has been lowered to engage the flared ends 100, 100 of the conduits 102, 102 with the parisons P, P, air under pressure is introduced through the said conduits to blow the parisons into the shape defined by the closed mold halves 80, 80 and the bottom plate 90. Then, after a predetermined period of time sufficient for the preliminary forming of the parison P to fill the preliminary blow mold cavity, blowing into the parison through the lines 102, 102 is cut off and at substantially the same time or in very close sequence, the mold halves 80, 80 are opened and the tongs 114 and 116 are closed on the respective parisons P, P. The parisons will rest upon the bottom plates 90 while the tongs are closed and the tongs are so closed by introducing air under pressure to the top of the second piston 104. When the parisons have been engaged by the tongs and the mold halves 80, 80 are separated, the parisons can be lifted slightly off the bottom plates 90 by a slight reduction in the pressure over the piston 94 permitting the blowhead to be elevated slightly for transfer with the carriage 18 to the station C.

When the blowhead and tong structure 32 reaches the station C, the halves of the final blow molds at the station will close upon the further formed parisons and then the tong pairs 114 and 116 are opened and the blowhead 96 is elevated before retraction of the carriage which will place the structure 32 back at the station B.

An important advantage resides in the further forming of the parisons P, P at the station B. That is, the further forming provides for better distribution of the glass, particularly in the manufacture of relatively light-weight articles of glassware.

Part of the desirable glass distribution occurs as a result of a re-heating. That is, when the initially formed parison is released by the blank mold structure at the station A, it no longer suffers heat loss to that blank mold structure and it starts to re-heat and stretch while being carried by the neck ring structure 30 and the carriage 18 to the station B. The mold halves 80, 80 and the bottom plate 90 at the station B are designed to extract a desired amount of heat from the initially formed parison as it is being further formed by the preliminary blowing.

Figure 7:
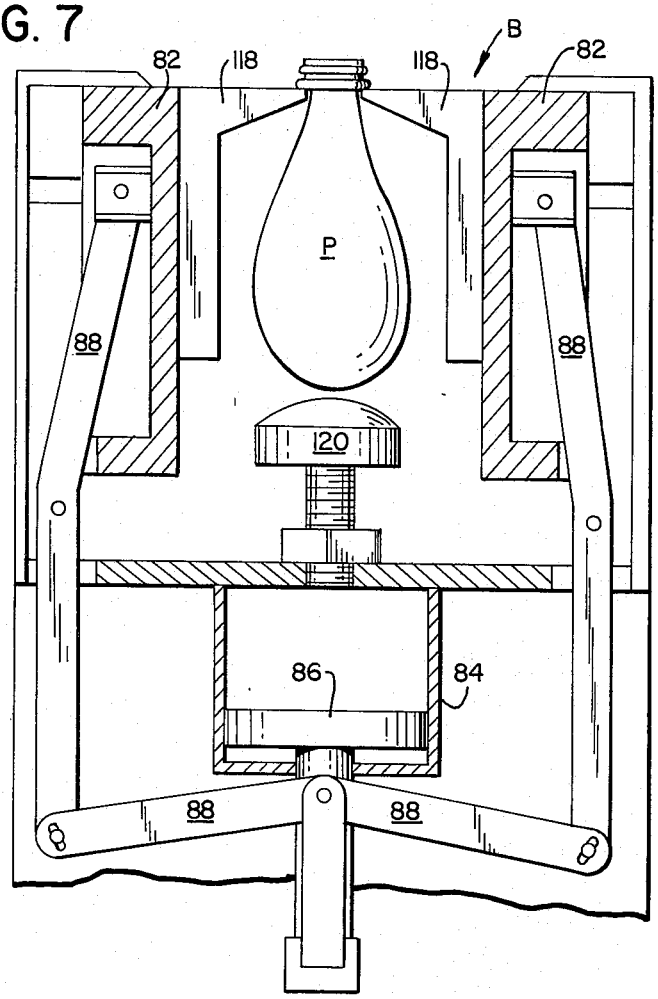
FIG. 7 is another transverse vertical sectional view taken through the second station of the machine section and showing an alternative construction for such station.

In the making of some articles of glassware, particularly long narrow-neck articles, it may be more desirable to permit further re-heating and streching of the parisons at the station B rather than to blow them into a preliminary shape. The alternative structure used for re-heating at the station B is shown in FIG. 7, and it will be seen that such alternative structure principally involves the substitution of opposed parison engaging fingers 118, 118 for the preliminary blow mold halves 80, 80 and the substitution of a patter plate 120 for the shaped bottom plate 90. The fingers 118, 118 are supported on the horizontally reciprocable carriers 82, 82 and merely engage the parisons on opposite sides thereof below the finish to support them in a suspended condition and thus to permit them to elongate or stretch during re-heat. The amount of stretch is limited by the patter plate 120 which also provides some support for the parisons as they are engaged by the tongs. When the re-heat fingers 118, 118 are employed, the tongs pairs are preferably arranged so that they will engage the parisons in positions spaced around the parisons from the fingers, thus permitting tong engagement of the parisons before the fingers 118, 118 are disengaged.

During the re-heating and stretching of the parison at the station B shown in FIG. 7, a short puff of air may be introduced into the interior of the parison in order to swell or balloon the parison. The use of such a puff of air may be desirable in order to prevent the opposite sides of the parison touching one another during the stretching operation, or to provide a better control of the shape of the parison, or to provide a variation in the time allowed for re-heating and stretching at station B. The puff is conveniently supplied to the interior of the parison from the blow head.

If, in the alternative construction of FIG. 7, no puff of air is to be introduced into the interior of the parison, the blow head forming a part of the assembly 32 can be eliminated if desired. If it is not eliminated, it is not used for blowing or puffing at station B, only the tong structure need be provided.

Figure 8:
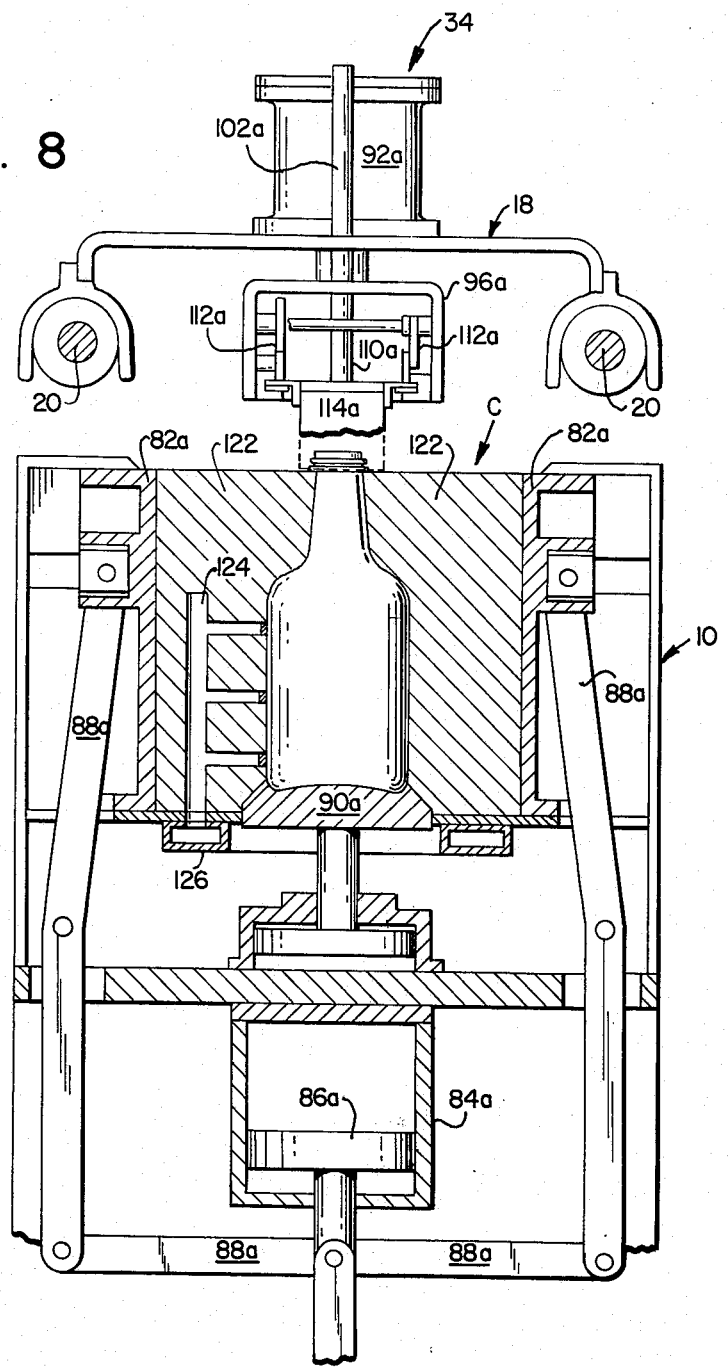
FIG. 8 is a transverse vertical sectional view taken through the third station of the machine section.

Except for the configuration of the final blow mold halves, the structure at the final shaping or final blow mold station C as shown in FIG. 8 is substantially the same as that used for preliminary blowing at the station B as shown in FIG. 5, and the blowhead and tong assembly 34 is substantially the same as the blowhead and tong assembly 32. Therefore, in order to avoid unnecessary description, the elements at the station C shown in FIG. 8 having substantially the same construction and operation as those shown in FIG. 5 are designated by the same reference numerals but with the suffix "*a*" added thereto.

The final blow mold halves 122, 122 used at the station C are, of course, different from the mold halves 80, 80 used at the station B because the cavity defined in station C is to provide the final shape for the article of glassware being formed. Further, since all of the desired re-heating of the parison will have taken place during transfer from the station A to the station B, at the station B, and during transfer to the station C, the final mold halves 122, 122 can be made of a material which will extract heat from the final article of glassware as it is blown to shape. It is desirable to extract heat from the glassware in its final shape, and to this end cooling passages such as indicated at 124 can be utilized in the mold halves 122 and supplied a stream of cooling air from conduit means indicated generally at 126. If desired, additional passages can be provided in the mold halves 122 for connection with a vacuum chamber to assist in the final shaping of the ware by reducing the pressure within the cavity and outside the parison as compared to that internally thereof. The bottom plate 90*a*, can also be provided with vacuum passages.

When the two parisons P, P at the final station C have been fully blown to the final shape of the article of glassware G, G and the mold halves 122, 122 have remained closed for the necessary period of in-mold cooling, the mold halves are opened and the tong pairs 114*a* and 116*a* of the assembly 34 engage the finished articles to transfer them with carriage 18 to a position on the deadplate 12 where they are released by opening the said tong pairs. While not shown, means can be provided for spraying or otherwise treating the articles G, G during movement from the station C to the deadplate 12 so that they will be made more tough and durable and thus capable of avoiding bottom checking and deformation due to their own weight.

After the articles have resided on the deadplate 12, and been further cooled, they are moved onto the conveyor 14 by mechanism (not shown) operated in a timed relationship with the operation of all of the other mechanisms associated with the individual machine section shown.

As a further additional optional feature, the mold halves 80 employed at the station B can also be provided with passages for connection with a vacuum chamber to assist in the further forming of the parison at station B. In another alternative embodiment of the invention the blowheads at both stations B and C are omitted and a gas pressure difference between the inside and the outside of the parison at station B and the inside and the outside of the further formed parison at station C is created by evacuating through passages in the intermediate and final molds.

The operation of the individual section will now be described, but as a preliminary thereto it is to be understood that this is just one of a plurality of sections operated in timed relationship to each other in a composite machine structure. In such machine structure or arrangement, a feeder mechanism will be provided to feed two gobs of glass to the sections in timed sequence and relationship and the finished articles of glassware G, G will be produced by the sections in the same timed relationship for ultimate movement onto the conveyor in a line or lines of glassware articles produced by the several sections of the machine.

OPERATION

It is believed that the step by step description of the press and blow process carried on by the machine section will be readily understood by reference to the following chart:

molten glass from the chutes 36, 36 which have been previously moved into position over the said molds at the station A by operation of the reversible fluid motor 46. At about the same point in time, the mold halves 80, 80 (FIG. 5) are closed on the parisons P, P at the station B and the neck ring parts 62, 62 are opened at the station B. It is important that the neck ring parts open when the mold parts close or very shortly thereafter. At the same time, the final mold halves 122, 122 close upon the further formed parisons at the station C and the tong pairs 114 and 116 of the assembly 32 open at the station C. Also at this time, the tong pairs 114a and 116a of the assembly 34 open at the deadplate 12.

The next step in operation at the station A is for the gobs of molten glass to be dropped into the open tops of the body molds 58. No additional step takes place at the stations B and C or at the deadplate 12, the molds having been closed at the station B and the neck rings opened, the molds having been closed at the station C and the tongs opened and the tongs having been opened at the deadplate 12.

After the gobs have been dropped into the one piece body molds at the station A, the reversible motor 46 is operated to shift the plungers 38, 38 into position over the body molds, and while this is going on, the carriage 18 is retracted to return the assembly 34 to station C, the assembly 32 to station B, and the neck ring structure 30 to station A.

The fourth step in the operation at station A then takes place and this constitutes the closing of the neck ring parts 62, 62. At substantially the same point in time, the blowhead 96 is lowered and starts the preliminary blowing of the initially formed parisons at the station B, and the blowhead 96a is lowered and starts the blowing of the further formed parisons into final shape

|     | STATION A | STATION B | STATION C | DEADPLATE |
| --- | --- | --- | --- | --- |
| 1.  | Body molds up | [Molds close | [Molds close | |
| 2.  | Gobs in | Neck Rings open | Tongs open] | Tongs open |
| 3.  | Plungers replace chutes | Carriage retracts | → | → |
| 4.  | Neck Rings close | Blowhead on | Blowhead on | |
| 5.  | Interm molds close | | | |
| 6.  | Plungers down | | | |
| 7.  | Plungers up | [Blowhead off | [Blowhead off | |
| 8.  | Interm molds open, Chutes replace plungers | Molds open | Molds open | |
| 9.  | Body molds down | Tongs close] | Tongs close] | |
| 10. | Carriage extends | → | → | → |

◯ Sequential Functions - Must Follow
[ ] Substantially Simultaneous Functions - Within about .2 seconds In describing operation with reference to the foregoing chart, it is to be assumed that the machine section has been in operation and that the carriage 18 has just been extended to transfer a pair of newly formed parisons from the station A to the station B, to transfer a pair of further formed parisons from the station B to the station C, and to transfer two fully formed articles of glassware G, G from the station C to the deadplate 12. It is at this point in time that the one piece body molds 58 are moved up to the position shown in FIG. 4 by the piston 64 so as to be ready to receive gobs of at the station C.

The fifth step in operation at the station A then takes place, this being the closing of the intermediate mold parts 60, 60 to clamp the neck ring parts 62, 62 and the body molds 58 into alignment to receive the plungers. No additional step takes place at the other stations or at the deadplate, the preliminary blowing being permitted to continue at the station B, the final blowing being permitted to continue at the station C, and cooling of the glassware articles G, G being permitted to continue at the deadplate 12.

While this blowing at stations B and C and cooling at the deadplate continues, the plungers 38, 38 are thrust into the parison molds at the station A this being accomplished by the plunger actuator 40 and comprising the sixth step of operation at the station A.

After a sufficient dwell, to assure proper distribution of the molten glass around the plungers in the parison or blank molds, the plungers are again elevated, and this is the seventh step occurring at station A. At about the same time, blowing is stopped at the stations B and C, the molds at said stations are opened and the tongs are closed at the stations B and C by the assemblies 32 and 34, respectively.

Then, the parts 60, 60 of the intermediate molds at the station A are opened, this being the eighth step, and at about the same time the reversible motor 46 is operated to move the chutes into position over the blank molds in place of the plungers. Nothing further takes place at the stations B and C, and at the deadplate, the parisons held by the tongs at the station B being permitted to re-heat, the final articles of glassware being held by the tongs at the station C being permitted to initially cool or to be treated, and the final articles of glassware at the deadplate being permitted to continue cooling.

The ninth step in operation at the station A involves movement of the one-piece body molds 58 downwardly by the piston 64 in preparation for extension of the carriage and movement of the initially formed parisons by the neck rings. At about this point in time it is desirable to move the cooled articles of glassware off the deadplate and onto the conveyor 14 by the mechanism usually operated for such purposes.

Then, the final step, step 10, in the process takes place, this being extension of the carriage 18 by the reversible fluid motors comprising the cylinders 24, 24 and annular pistons 26, 26. This moves the newly formed parisons to station B, the further formed parisons to station C, and two newly formed articles of glassware to the deadplate 12 and all structure is restored to the condition for the start of the new cycle with step 1 thereof.

It will thus be seen from the above chart that the machine timing control is by a combination of independent mechanism control and sequence timing. Those mechanism motions which, if they were to malfunction, would cause damage or a serious jam of the machine are sequence timed such that there is interlock and fail-safe provisions should any of these mechanisms not complete its full operational movement.

As examples of mechanisms where fail-safe provisions should be included, downward movement of the plungers 38, 38 should only be permitted when the lateral motion of the plungers under control of the reversible motor 46 has been precisely completed; the carriage 18 should not be permitted to extend unless the plungers 38, 38 have been fully elevated; and the one-piece body molds 58 should not be moved downwardly in step 9 of the operation unless the intermediate molds 16 have been fully opened.

The aforedescribed glassware forming machine apparatus and process provides for the manufacture of high quality narrow neck or wide mouth articles of glassware utilizing a press and blow technique at higher rates of production than could be accomplished by the more conventional apparatus such as shown in U.S. Pat. No. 1,911,119. In any I.S. machine the time employed in the operations at each station is dictated by the operation having the greatest station time. In press and blow glassware manufacture the time taken is largely dictated by the time needed for blowing and initial cooling in the two steps conventionally used. That is, little time is needed for the pressing operation which constituted the first step, but the whole process must be slowed down for the blowing.

In keeping with this invention wherein the blowing is carried on as a two stage operation, or as a re-heat stage and a final blowing stage, and wherein three operating stations are provided in the machine section, the time of operation at each station can be matched to that needed for the pressing at the first station, or, possibly, to that needed for re-heating at the second station in a press, re-heat and blow process. This provides for the production of glassware at the much higher desired rate.

The process and apparatus in accordance with this invention wherein the glass article is formed from the parison in two stages provides particular advantages in the manufacture of lightweight glassware where a longer re-heat time is required to enable the parison to stretch to produce the thin glass.

Also, a process and apparatus in accordance with the present invention in which the glass article is formed from the parison by two blowing stages at the second and third stations respectively provides for adjustment of the re-heat time between the formation of the parison by pressing at the first station and the intermediate blow at the second station, the time for which the intermediate blowing is performed at the second station, and the re-heat time between the termination of the intermediate blowing at the second station and the commencement of the final blowing stage at the third station. By these adjustments, and also by choice of the shape, material and temperature of the intermediate blow mold formed by the mold halves 80, 80 at the second station, the re-heat efficiency can be enhanced and the distribution of the glass in the article formed at the final blow mold in the third station can be more accurately controlled than was possible in prior art processes.

Apparatus in accordance with the present invention may, however, be utilised to perform a process similar to the two stage process which is currently performed in a standard I.S. machine by the press and blow technique to manufacture glass articles of heavy construction. In such circumstances the third station in the apparatus of the present invention is utilised for a process step subsequent to the final formation of the glass article. This extra process step may be an extra cooling step preparatory to the glass article being placed on the conventional conveyor or the conventional conveyor deadplate, the glass article being cooled in this additional step whilst suspended on fingers similar to the fingers 118 shown in FIG. 7 or whilst it is placed on a special deadplate. Alternatively, the third station in the apparatus of the present invention may be used for an additional treatment of the glass article, for example for spray coating of the glass article from underneath and from the sides so that a protective coating is applied to the glass article, and particularly to its base, before it is brought into contact with any other material.

I claim:

1. A glassware forming machine section comprising a frame having means defining three operating stations for parison forming, further parison forming, and final shaping which are horizontally spaced apart longitudinally of the frame, the said means at the first such station including at least one upright top-opening blank or parison mold, mechanism supported over the frame and over said blank mold including guide means for introducing a gob of molten glass into the blank mold and also including a plunger and means for thrusting the plunger into the blank mold to form a parison from the gob of molten glass, the said means at the second of said stations including movable parts to engage and support a parison for further forming and to disengage and release the further formed parison, the said means at the third said station including a mold adapted to engage and support the further formed parison for final shaping to an article of glassware and to release the formed article, a head structure supported over the frame and over the last said mold and cooperating with that mold in the final shaping of the article by causing greater gas pressure within than without the further formed parison, and a transfer mechanism for parisons and finished articles including a horizontally movable carriage supported over the frame and means for reciprocating the carriage longitudinally of the frame between retracted and extended positions; the said carriage carrying a neck ring structure and first and second tong structures which in the retracted position of the carriage respectively engage parisons at the first, second and third stations, and in the extended position respectively release an initially formed parison at the second station, a further formed parison at the third station and a finally formed article beyond the third station.

2. The forming machine section of claim 1 wherein the top-opening blank or parison mold comprises a vertically movable one-piece body portion forming the lower portion of the parison cavity, and the neck ring structure comprises horizontally movable parts which engage each other to form the upper portion and finish of the parison cavity and to support a parison formed therein, the said body portion of the mold being movable downwardly off a formed parison to permit it to be transferred by the neck ring and carriage to the second station.

3. The apparatus as defined in claim 2 wherein a fluid motor cylinder and piston are provided for raising and lowering the body portion of the mold in timed relationship to the operation of the other structure in the machine section.

4. The forming machine section of claim 2 including a two-piece intermediate mold portion, the two pieces of which are movable horizontally into engagement with each other and with the neck ring parts and body portion of the mold to define an intermediate portion of the parison cavity.

5. The apparatus as defined in claim 4 wherein a fluid motor cylinder and piston are provided for engaging and disengaging the pieces of the intermediate mold portion and said pieces are adapted to clamp the neck ring parts together and to so engage the body portion of the mold that the two pieces of the intermediate mold portion must be disengaged before the mold body portion can be moved downwardly off a formed parison to permit subsequent transfer of the parison by the neck ring and carriage.

6. The forming machine section set forth in claim 1 wherein said mechanism supported over the frame and over the blank mold comprises a movable support structure over the frame carrying a guide chute and a plunger actuator, and a reversible motor for selectively positioning the chute and actuator over the blank mold respectively to guide a gob of molten glass into the blank mold and to thrust a plunger into the blank mold to form a parison from the gob.

7. The forming machine section of claim 1 wherein the said parts at said second station comprise the pieces of a multi-part mold movable substantially horizontally to engage each other and a parison carried by said neck ring structure from the first to the second station, the said pieces cooperating to define a cavity within which said parison is enlarged and further deformed.

8. The apparatus as set forth in claim 7 including a bottom plate engaged by the pieces of the multi-part mold and cooperating therewith to define the said cavity, and wherein a cylinder and piston are provided for engaging and disengaging the said pieces.

9. The structure defined in claim 7 wherein a vertically movable head is adapted to be lowered into association with a parison engaged by the pieces of the said multi-part mold and after release thereof by the said neck ring structure, the said head being further adapted to introduce gas under pressure to the interior of the parison to cause the said enlargement and further forming thereof.

10. The structure of claim 9 wherein said movable head is supported by said carriage and includes said first tong structure and means for operating the same to engage said parison above the pieces of the said multi-part mold to provide support for the parison after release thereof by said multi-part mold.

11. The apparatus of claim 10 wherein a cylinder and piston are employed to lower and raise said head, and wherein a linkage is connected between said first tong structure and such piston to effect engagement and disengagement of the parison by the first tong structure responsive to such piston operation.

12. The forming machine section of claim 1 wherein the said parts at said second station comprise a pair of generally opposed fingers movable substantially horizontally toward and away from each other respectively to engage and support and to release a parison which has been carried to said second station by said neck ring structure, the said fingers engaging the parison below the neck ring structure.

13. The apparatus of claim 12 wherein a cylinder and piston are provided moving the said fingers toward and away from each other.

14. The forming machine apparatus set forth in claim 1 wherein the mold at said third station is split and has parts movable substantially horizontally to engage each other and a parison carried by said first tong structure from the second station to the third station, the parts of said mold cooperating to define a cavity within which said parison is enlarged to the final desired shape of the article of glassware.

15. The apparatus of claim 14 including a bottom plate engaged by the said mold parts and cooperating therewith to define the said cavity, and wherein a cylinder and piston are provided for engaging and disengaging the said mold parts.

16. The apparatus of claim 15 wherein said head structure is vertically movable and adapted to be lowered into association with a parison engaged by the said mold parts and after release thereof by the first tong structure, the said head structure being further adapted to introduce gas under pressure to the interior of the parison to effect the final shaping thereof.

17. The apparatus of claim 16 wherein said head structure is supported by said carriage and includes said second tong structure and means for operating the same to engage said parison below its finish whereby to support and lift the finally shaped article off said bottom plate after disengagement of the said mold parts.

18. The apparatus of claim 17 wherein a cylinder and piston are employed to lower and raise said head structure, wherein a second piston is supported by the head structure for vertical reciprocation relative thereto, and wherein linkage is connected between said second tong structure and said second piston to effect engagement and disengagement of the parison by said second tong structure responsive to operation of said second piston.

19. The forming machine section of claim 1 wherein said transfer mechanism comprises at least one guide extending longitudinally of the section frame over the three operating stations thereof and said carriage is supported on and movable along said guide, and wherein a reversible motor is provided to reciprocate said carriage between its said retracted and extended positions.

20. The forming machine section of claim 1 wherein said transfer mechanism comprises a pair of longitudinally extending guide rods over the section frame straddling the three operating stations thereof and said carriage is supported on and movable along said pair of rods, and wherein a reversible motor is provided to reciprocate said carriage between its said retracted and extended positions.

21. The forming machine section of claim 20 wherein there are two such reversible motors provided, each of which comprises a cylinder and an annular piston surrounding a respective one of said guide rods and engaged with the said carriage, the said reversible motors being operated simultaneously to extend and retract the carriage.

22. The forming machine section of claim 1 wherein said transfer mechanism comprises at least one longitudinally extending guide rod over the section frame and said carriage is supported on and movable along said rod, a reversible motor is provided to reciprocate said carriage, said neck ring structure comprises parts movable toward each other to engage a parison and away from each other to release a parison, wherein rack and pinion means are carried by said carriage to so move said neck ring parts, the said pinion being slidable on but rotatable with said guide rod, and wherein reversible means is provided for rotating said guide rod.

23. The apparatus set forth in claim 1 wherein said transfer mechanism comprises a pair of longitudinally extending guide rods over the section frame straddling the three operating stations thereof with the carriage supported on and movable along said pair of rods, and further characterized by at least one reversible motor reciprocating said carriage, the neck ring structure comprising parts movable toward each other to engage a parison and away from each other to release a parison, each of said neck ring parts being mounted on a rack carried by the carriage for movement transversely of the machine section, and each such guide rod having a pinion slidable thereon with the carriage but rotatable with the rod and engaging a respective one of said racks, and a reversible motor for rotating said rods to effect said movement of the neck ring parts.

24. The apparatus of claim 23 wherein there are two reversible motors operated simultaneously to reciprocate the carriage, each of which comprises a cylinder and an annular piston surrounding a respective one of said guide rods and engaged with the carriage.

25. A glassware forming machine section comprising a frame having means defining three operating stations for parison forming, further parison forming, and final shaping which are horizontally spaced apart longitudinally of the frame, the said means at the first such station including at least one upright top-opening blank or parison mold, mechanism supported over the frame and over said blank mold including guide means for introducing a gob of molten glass into the blank mold and also including a plunger and means for thrusting the plunger into the blank mold to form a parison from the gob of molten glass, the said means at the second of said stations including movable parts to engage and support a parison for further forming and to disengage and release the further formed parison, the said means at the third said station including a mold adapted to engage and support the further formed parison for final shaping to an article of glassware and to release the formed article, means associated with the last said mold in the final shaping of the article for causing a greater gas pressure within the further formed parison than is present outside the further formed parison, and a transfer mechanism for parisons and finished articles including a horizontally movable carriage supported over the frame and means for reciprocating the carriage longitudinally of the frame between retracted and extended positions; the said carriage carrying a neck ring structure and first and second tong structures which in the retracted position of the carriage respectively engage parisons at the first, second and third stations, and in the extended position respectively release an initially formed parison at the second station, a further formed parison at the third station and a finally formed article beyond the third station.

26. A glassware forming machine section comprising a frame having means defining three stations for parison forming, further parison forming, and final shaping which are horizontally spaced apart longitudinally of the frame, wherein the said means at the first of such stations is utilized to form a parison and said means at another of such stations is used for final shaping of the parison to an article of glassware by causing a greater gas pressure within the parison than is present outside the parison, and a transfer mechanism for moving a parison from the first such station and for simultaneously moving an article of glassware from the said another station, the transfer mechanism including at least one guide rod extending longitudinally of the frame over the said three stations, a carriage supported on the said guide rod for reciprocation therealong, a reversible motor connected with the carriage and for reciprocating the carriage between a retracted and an extended position, a neck ring structure supported by the carriage and having parts movable transversely of the frame toward each other to engage and support a parison at the first station in the retracted position of the carriage and away from each other to release a parison at the second station in the extended position of the carriage, a pair of tongs supported on the said carriage with the tongs in the pair being movable toward each other at the said second station in the retracted position of the carriage to engage a parison or an article and being movable away from each other in the extended position of the carriage to release such article or parison at the third station, and a further pair of tongs supported on the said carriage with the tongs in the pair being movable toward each other at the third station in the retracted position of the carriage to engage a glass article and being movable away from each other in the extended position of the carriage to release such glass article beyond said third station.

* * * * *